United States Patent
Pfennigwerth et al.

(10) Patent No.: US 12,415,424 B2
(45) Date of Patent: Sep. 16, 2025

(54) METHOD FOR ANALYZING THE CONDITION OF A TRACTION BATTERY, AND MOTOR VEHICLE

(71) Applicant: Volkswagen Aktiengesellschaft, Wolfsburg (DE)

(72) Inventors: Ralf Pfennigwerth, Lehre (DE); Christian Wick, Cremlingen (DE); Gerd Stoehr, Wesendorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 208 days.

(21) Appl. No.: 18/208,047

(22) Filed: Jun. 9, 2023

(65) Prior Publication Data
US 2023/0398873 A1 Dec. 14, 2023

(30) Foreign Application Priority Data
Jun. 10, 2022 (DE) ............ 10 2022 205 892.5

(51) Int. Cl.
*B60L 3/00* (2019.01)
*B60L 7/10* (2006.01)
*B60L 58/16* (2019.01)

(52) U.S. Cl.
CPC ............ *B60L 3/0046* (2013.01); *B60L 7/10* (2013.01); *B60L 58/16* (2019.02); *B60L 2240/545* (2013.01)

(58) Field of Classification Search
CPC .... B60L 3/0046; B60L 2240/545; B60L 3/12; B60L 7/10; B60L 58/16
See application file for complete search history.

(56) References Cited

U.S. PATENT DOCUMENTS

| | | | |
|---|---|---|---|
| 10,386,422 B2 | 8/2019 | Christensen et al. | |
| 2013/0229156 A1 | 9/2013 | Brandon et al. | |
| 2018/0115272 A1 | 4/2018 | Kitaori et al. | |
| 2021/0257633 A1* | 8/2021 | Breu | H01M 16/006 |
| 2022/0216699 A1* | 7/2022 | Wang | H02J 7/005 |
| 2022/0268846 A1* | 8/2022 | Lopez De Arroyabe | B60L 58/20 |
| 2023/0324469 A1* | 10/2023 | Choi | G01R 31/367 702/60 |
| 2023/0361288 A1* | 11/2023 | Groombridge | C01G 37/006 |

FOREIGN PATENT DOCUMENTS

| | | |
|---|---|---|
| DE | 102012209646 A1 | 12/2013 |
| DE | 202019102519 U1 | 8/2020 |
| WO | WO2016012922 A1 | 1/2016 |

* cited by examiner

*Primary Examiner* — Rodney A Butler
(74) *Attorney, Agent, or Firm* — Muncy, Geissler, Olds & Lowe, P.C.

(57) ABSTRACT

A motor vehicle and method for analyzing the condition of a traction battery of a motor vehicle, wherein the motor vehicle includes an electric or hybrid propulsion system with an electric motor for driving the motor vehicle, power electronics for driving the electric motor, a battery management system with a monitoring device for monitoring the traction battery, and the traction battery. Impedance spectroscopy is performed on the traction battery with an alternating current across multiple alternating current frequencies. At least one battery parameter of the traction battery is determined based on the impedance spectroscopy performed. In the context of impedance spectroscopy, the traction battery is supplied with alternating current at several alternating current frequencies by the power electronics.

9 Claims, 3 Drawing Sheets

METHOD FOR ANALYZING THE CONDITION OF A TRACTION BATTERY, AND MOTOR VEHICLE

This nonprovisional application claims priority under 35 U.S.C. § 119(a) to German Patent Application No. 10 2022 205 892.5, which was filed in Germany on Jun. 10, 2022, and which is herein incorporated by reference.

BACKGROUND OF THE INVENTION

Field of the Invention

The present invention relates to a method for analyzing the condition of a traction battery of a motor vehicle. Furthermore, the invention relates to a motor vehicle with a generic traction battery.

Description of the Background Art

It is known to determine the condition of a battery using electrochemical impedance spectroscopy. Batteries are electrochemical cells with a negative electrode and a positive electrode, which are electrically coupled to each other via an electrolyte. An electron current of the electrochemical cell depends on whether the battery is charged or discharged.

In electrochemical impedance spectroscopy of a battery, an alternating current with time-varying frequencies is imprinted into the battery and a frequency-dependent alternating current resistance of the battery is determined. For example, the change in the frequency of the alternating current can be continuous, for example with a constant gradient, or erratic. The spectrum of frequency-dependent resistances generated in this way can be represented, for example, in a Bode diagram or a Nyquist diagram. Electrochemical impedance spectroscopy, for example, can be used to determine a cell temperature and a state of charge of the battery.

From the document WO 2016/012 922 A1, which corresponds to US a method for analyzing the condition of a traction battery of a motor vehicle using electrochemical impedance spectroscopy is known. For this purpose, a conventional battery management system (BMS) is upgraded with an additional frequency generator, which successively loads the battery with an alternating current spectrum of different frequencies. A microprocessor of the BMS is used to evaluate the reaction of the battery to the alternating currents.

Document DE 10 2012 209 646 A1 concerns a method for determining a state of wear of a battery module. According to the method, several battery modules are provided in a motor vehicle, wherein one of which is separated and measured by means of electrochemical impedance spectroscopy. For this purpose, a battery management system is upgraded to include an alternator.

Known methods for analyzing the condition of a traction battery of a motor vehicle have the disadvantage that additional hardware, such as an alternator, must be provided. This increases the manufacturing costs as well as the total weight of the motor vehicle. In addition, it is sometimes necessary to disconnect the traction battery from the onboard power supply when the analysis is performed, rendering the battery unavailable to the motor vehicle to operate the electric motor.

SUMMARY OF THE INVENTION

It is therefore an object of the present invention to remedy or at least partially remedy the disadvantages described above in a method for analyzing the condition of a traction battery of a motor vehicle. In particular, an object of the present invention is to create a method and a motor vehicle which avoid increased manufacturing costs in a simple and cost-effective manner and/or ensure a reliable analysis of the condition of the traction battery when the motor vehicle is operated.

Accordingly, the object is achieved in an exemplary embodiment by a method for analyzing the condition of a traction battery of a motor vehicle and by a motor vehicle with an electric or hybrid drive system. In this context, features and details described in connection with the method according to the invention naturally also apply in connection with the motor vehicle according to the invention and vice versa, so that with regard to the disclosure of the individual aspects of the invention, reference is or can always be made to each other.

According to a first aspect of the invention, the object is achieved by a method for analyzing the condition of a traction battery of a motor vehicle. The motor vehicle has an electric or hybrid drive system with an electric motor to drive the motor vehicle, power electronics to operate the electric motor, a battery management system with a monitoring device to monitor the traction battery, and the traction battery. The method comprises: performing impedance spectroscopy on the traction battery with one alternating current across multiple alternating current frequencies, and determining at least one battery parameter of the traction battery based on the impedance spectroscopy performed.

According to the invention, the traction battery can be supplied with alternating current at several alternating current frequencies by the power electronics in the context of impedance spectroscopy.

The motor vehicle with which the method according to the invention is carried out has an electric drive system or a hybrid drive system. In the context of the invention, an electric drive system is understood to be a drive system which has at least one electric motor to drive the motor vehicle and no internal combustion engine. In the context of the invention, a hybrid drive system is understood to be a drive system which has at least one electric motor to drive the motor vehicle and an internal combustion engine. In a hybrid drive system, such as a full hybrid, the electric motor can be designed to drive the motor vehicle independently, for example when the internal combustion engine is switched off. Alternatively, in a hybrid drive system, such as a mild hybrid, the electric motor may be designed to merely support the internal combustion engine to drive the motor vehicle. Preferably, the electric motor of the motor vehicle is designed to recuperate electrical energy when braking the motor vehicle.

The traction battery can be designed to provide electrical energy to operate the electric motor. Preferably, the traction battery is designed to provide a direct current. More preferably, the traction battery is designed as a high-voltage battery and has, for example, a voltage of around 400 V. The traction battery, for example, has lithium ions. In the context of the invention, a battery parameter is understood to be a parameter by which the condition of the traction battery can be described. Thus, battery parameters can also be referred to as data about the condition of the traction battery. The battery parameters, which can be determined in the course of carrying out the method according to the invention, may include, for example, the state of charge, the temperature, the capacitance, the voltage, the state of wear of the traction battery or the like.

The power electronics can be designed to operate the electric motor. For this purpose, the power electronics preferably include a pulse inverter. Preferably, the power electronics are designed to convert a direct current from the traction battery into an alternating current to operate the electric motor. In addition, the power electronics are designed to apply alternating current to the traction battery and to vary a frequency of the alternating current. Furthermore, the power electronics are designed to convert electrical recuperation energy from the electric motor to charge the traction battery, especially into direct current.

As part of the implementation of the method, impedance spectroscopy can be performed on the traction battery. For this purpose, the traction battery is supplied with alternating current by the power electronics and the frequency of the alternating current is changed, preferably several times. Furthermore, a frequency-dependent reaction of the traction battery to the alternating current is determined. In this context, for example, battery currents and/or battery voltages can be determined. In this way, frequency-dependent impedances of the traction battery can be determined. Finally, at least one battery parameter is determined on the basis of the determined frequency-dependent reaction of the traction battery. This is preferably done based on a battery map of the traction battery.

A method according to the invention for analyzing the condition of a traction battery of a motor vehicle has the advantage over conventional methods that impedance spectroscopy can be carried out by simple means and in a cost-effective manner and that the at least one battery parameter can be derived from the result of impedance spectroscopy. Since the alternating voltage required for impedance spectroscopy is generated by means of the power electronics used to operate the electric motor, there is no need for a complex workshop setup or a cost-intensive upgrade of the battery management system with an additional frequency generator. The method can therefore be carried out very flexibly and reliably at reduced cost.

It may be provided that the method can be carried out while the motor vehicle is in motion. In particular, being in motion is understood to mean a state of the motor vehicle in which the motor vehicle rolls and thus moves. An onboard power supply of the motor vehicle is activated in this state, so that the power electronics are supplied with electrical energy by the traction battery to generate the alternating current. In this case, it is preferred if the power electronics use electrical recuperation energy from the electric motor to apply alternating current to the traction battery. In other words, according to the invention, it is preferable that the method according to the invention is carried out during recuperation, so that the total current load of the traction battery can be reduced and the accuracy of the impedance spectroscopy can be improved. This has the advantage that reliable battery parameters of the traction battery can be determined by simple means and in a cost-effective manner while the motor vehicle is in motion and that it is not necessary to stop the motor vehicle or start a test bench, for example in a car repair shop.

The electric motor can be energized by the power electronics during the performance of impedance spectroscopy on the traction battery to drive the motor vehicle. In this preferred case, the power electronics are designed to simultaneously provide an alternating current to operate the electric motor and an alternating current to apply to the traction battery for performing impedance spectroscopy. In this case, it is preferred if the electrical energy for operating the power electronics is provided exclusively or predominantly by the traction battery. This has the advantage that at least one battery parameter can be reliably determined with simple means and in a cost-effective manner in a large number of operating situations of the motor vehicle.

When performing impedance spectroscopy, an operating point of the power electronics can be shifted in such a way that a drive torque and/or a drive speed of the electric motor is not changed by the current supply to the traction battery. This is to be understood as an operation of the power electronics which does not change a driving experience when the motor vehicle is driven. Accordingly, the power electronics are operated in such a way that the effects of the imprint of the alternating current on the traction battery are compensated in such a way that the drive torque and/or the drive speed of the electric motor are not affected. This has the advantage of ensuring normal driving of the motor vehicle by simple means and in a cost-effective manner when the method for analyzing the condition of the traction battery is being implemented.

When performing impedance spectroscopy, the traction battery can be subjected to a maximum alternating current frequency, which is less than one-fifth, preferably less than one-tenth, of an alternating current frequency for energizing the electric motor through the power electronics. Furthermore, it is also preferred that the traction battery is subjected to additional alternating current frequencies that are smaller than the maximum alternating current frequency when performing impedance spectroscopy. This has the advantage that with simple means and in a cost-effective manner, a high level of reliability in the analysis of the condition of the traction battery is guaranteed and the load on the traction battery is reduced. Furthermore, the load on the power electronics can be reduced in this way.

For example, at least one battery parameter, a state of charge and/or a battery temperature of the traction battery can be determined. Such battery parameters can be easily determined from the result of impedance spectroscopy, for example by using a corresponding characteristic map of the traction battery. This has the advantage that with simple means as well as in a cost-effective manner, relevant information on the condition of the traction battery is easily available to the driver of the motor vehicle.

Impedance spectroscopy can be performed with less than ten pulses per alternating current frequency. Particularly preferred, impedance spectroscopy can be performed with about five pulses per alternating current frequency. With such a number of pulses, impedance spectroscopy can be performed reliably. This has the advantage that with simple means and in a cost-effective manner, a high level of reliability in the analysis of the condition of the traction battery is guaranteed and the load on the traction battery is reduced. Furthermore, the load on the power electronics can be reduced in this way.

In the context of impedance spectroscopy, it is particularly preferable to use a monitoring device to determine a reaction of the traction battery to the impact of the alternating current. In other words, in impedance spectroscopy, the excitation signal is imprinted by the power electronics of the traction battery, and the response signal of the traction battery is determined by the monitoring device of the battery management system. This has the advantage that a particularly efficient use of the motor vehicle resources is guaranteed by simple means and in a cost-effective manner.

According to the invention, the monitoring device can determine the at least one battery parameter. In this case, it is preferred that the reaction of the traction battery to the impact of the alternating current is also determined by the monitoring device. The at least one battery parameter is preferably determined using a battery map of the traction battery, wherein the battery map describes the relation of the at least one battery parameter or several different battery parameters to the impedance spectrum of the traction battery. This has the advantage that a particularly efficient use of the motor vehicle resources is guaranteed by simple means and in a cost-effective manner.

The motor vehicle can have an electric or hybrid drive system with an electric motor to drive the motor vehicle, power electronics to operate the electric motor, a traction battery to store electrical energy to operate the electric motor, and a battery management system including a monitoring device to monitor the traction battery. According to the invention, the drive system is designed to carry out a method according to the invention.

The motor vehicle can have an electric drive system or a hybrid drive system. In the context of the invention, an electric drive system can be understood to be a drive system which has at least one electric motor to drive the motor vehicle and no internal combustion engine. In the context of the invention, a hybrid drive system is understood to mean a drive system which has at least one electric motor to drive the motor vehicle and an internal combustion engine. In a hybrid drive system, such as a full hybrid, the electric motor can be designed to drive the motor vehicle independently, for example when the internal combustion engine is switched off. Alternatively, in a hybrid drive system, such as a mild hybrid, the electric motor may be designed to merely support the internal combustion engine to drive the motor vehicle. Preferably, the electric motor of the motor vehicle is designed to recuperate electrical energy when braking the motor vehicle.

The traction battery can be designed to provide electrical energy to operate the electric motor. Preferably, the traction battery is designed to provide a direct current. Preferably, the traction battery is designed as a high-voltage battery and has, for example, a voltage of around 400 V. The traction battery, for example, has lithium ions. In the context of the invention, a battery parameter is understood to be a parameter by which the condition of the traction battery can be described. Thus, battery parameters can also be referred to as data about the condition of the traction battery. The battery parameters which can be determined in the course of carrying out the method according to the invention may include, for example, a state of charge, a temperature, a capacity, a voltage, a state of wear of the traction battery or the like.

The power electronics can be designed to operate the electric motor. For this purpose, the power electronics can include a pulse inverter. Preferably, the power electronics can be designed to convert a direct current from the traction battery into an alternating current to operate the electric motor. In addition, the power electronics are designed to apply alternating current to the traction battery and to vary the frequency of the alternating current. Furthermore, the power electronics are designed to convert electrical recuperation energy from the electric motor to charge the traction battery, especially into direct current.

The motor vehicle according to the invention has all the advantages already described in the method for analyzing the condition of a traction battery of a motor vehicle according to the first aspect of the invention. Accordingly, the motor vehicle according to the invention has the advantage over conventional motor vehicles that a reliable analysis of the condition of the traction battery is guaranteed by simple means and in a cost-effective manner by performing impedance spectroscopy and determining at least one battery parameter. Since the alternating voltage required for impedance spectroscopy is generated by means of the power electronics used to operate the electric motor, there is no need for a complex workshop setup or a cost-intensive upgrade of the battery management system with an additional frequency generator. The motor vehicle thus has a reduced cost and also ensures a particularly flexible analysis of the condition of the traction battery.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
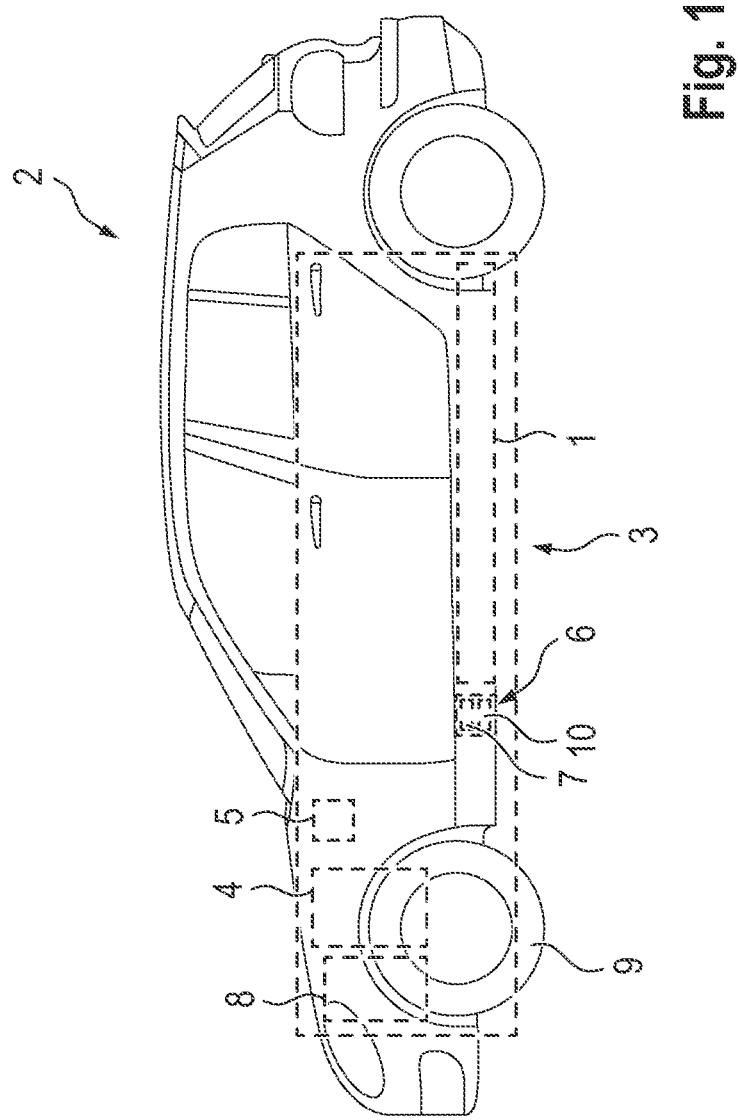
FIG. 1 shows, in a side view, a schematical example of a motor vehicle according to the invention.

FIG. 1 shows an example of a motor vehicle 2 schematically in a side view. The motor vehicle 2 has a drive system 3, which is exemplarily designed as an electric drive system 3. The drive system 3 has an electric motor 4 to drive the motor vehicle 2, which is coupled via a gearbox 8 with wheels 9 of the motor vehicle 2. To operate the electric motor 4, the drive system 3 has power electronics 5. For absorbing, storing and releasing electrical energy, the drive system 3 has a traction battery 1, which can be monitored via a battery management system 6 of the drive system 3. The battery management system 6 has a monitoring device 7 for determining battery parameters and for the targeted control, connecting, disconnecting or the like of battery cells of the traction battery as well as a storage device 10 for storing a battery map or the like.

Figure 2:
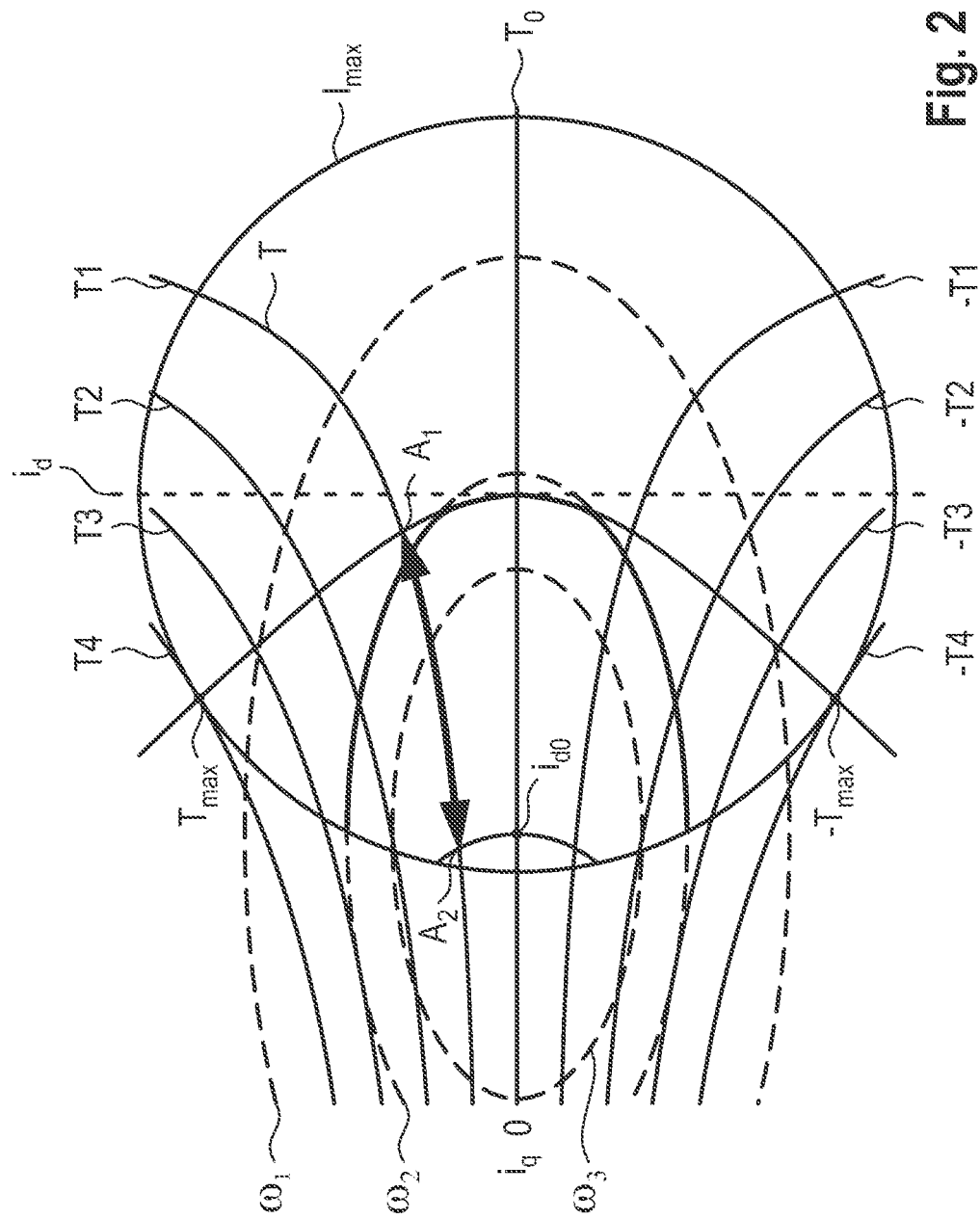
FIG. 2 shows a map of the power electronics of a motor vehicle drive system.

FIG. 2 shows a map of the power electronics 5 of the drive system 3 of the motor vehicle 2. Several different drive torques T are shown in the map, wherein on a drive torque T a first operating point $A_1$ is shown for the operation of the drive system 3, without simultaneous execution of the method according to the invention. In order to ensure a constant torque T during the implementation of the method according to the invention, a shift to a second operating point $A_2$ is carried out for this purpose.

Figure 3:
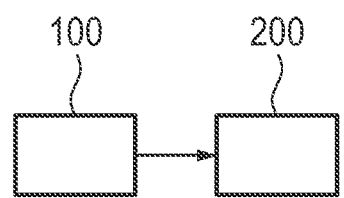
FIG. 3 shows, in a flow chart, an example of a method according to the invention.

FIG. 3 shows an example of a method according to the invention schematically mapped in a flow chart. In a first method action 100, impedance spectroscopy is performed on the traction battery 1 of the motor vehicle 2. In this case, alternating currents with several different alternating current frequencies are generated by the power electronics 5 and imprinted on the traction battery 1. In addition, the reaction of the traction battery 1 to the imprint of the alternating currents by the monitoring device 7 is determined. This results in an impedance spectrum of the traction battery 1.

In a second method action 200, the impedance spectrum of the traction battery 1 is evaluated by the monitoring device 7 and at least one battery parameter of the traction battery 1 is derived from this. This is preferably done using a battery map of the traction battery 1, which is stored in the storage device 10 of the battery management system 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for analyzing a condition of a traction battery of a motor vehicle, the motor vehicle comprising an electric or hybrid drive system with an electric motor to drive the motor vehicle, power electronics to drive the electric motor, a battery management system with a monitoring device for monitoring the traction battery, and the traction battery, the method comprising:
   performing impedance spectroscopy on the traction battery with an alternating current across multiple alternating current frequencies, the alternating current for performing the impedance spectroscopy being supplied to the traction battery by the power electronics that drives the electric motor; and
   determining at least one battery parameter of the traction battery based on the impedance spectroscopy performed,
   wherein the method is carried out while the motor vehicle is in motion, and
   wherein the power electronics provides another alternating current to the electric motor to energize the electric motor simultaneously while providing the alternating current to the traction battery for performing the impedance spectroscopy, so that the electric motor is energized by the power electronics to drive the motor vehicle when the impedance spectroscopy is performed on the traction battery.

2. The method according to claim 1, wherein, when the impedance spectroscopy is performed, an operating point of the power electronics is shifted in such a way that a drive torque and/or a drive speed of the electric motor is not changed by the alternating current supplied to the traction battery.

3. The method according to claim 1, wherein, when the impedance spectroscopy is performed, the traction battery is subjected to a maximum alternating current frequency which is less than one-fifth or less than one-tenth of an alternating current frequency for energizing the electric motor by the power electronics.

4. The method according to claim 1, wherein the at least one battery parameter includes a state of charge and/or a battery temperature of the traction battery.

5. The method according to claim 1, wherein the impedance spectroscopy is performed with less than ten pulses per alternating frequency.

6. The method according to claim 1, wherein during the performance of the impedance spectroscopy, the monitoring device determines a reaction of the traction battery to the impact of the alternating current.

7. The method according to claim 1, wherein the monitoring device determines the at least one battery parameter.

8. A motor vehicle comprising:
   an electric or hybrid drive system with an electric motor to drive the motor vehicle;
   power electronics to drive the electric motor;
   a traction battery to store electrical energy to drive the electric motor; and
   a battery management system with a monitoring device to monitor the traction battery,
   wherein the drive system is designed to carry out the method according to claim 1.

9. The method according to 1, wherein electrical energy for operating the power electronics is provided predominantly by the traction battery.

* * * * *